United States Patent
Chaudhary et al.

(10) Patent No.: US 10,669,047 B2
(45) Date of Patent: Jun. 2, 2020

(54) SYSTEM AND METHOD FOR HYPERSONIC PAYLOAD SEPARATION

(71) Applicant: THE BOEING COMPANY, Chicago, IL (US)

(72) Inventors: Ashwani K. Chaudhary, Cypress, CA (US); David Poladian, Glendale, CA (US)

(73) Assignee: THE BOEING COMPANY, Chicago, IL (US)

(*) Notice: Subject to any disclaimer, the term of this patent is extended or adjusted under 35 U.S.C. 154(b) by 445 days.

(21) Appl. No.: 15/604,175

(22) Filed: May 24, 2017

(65) Prior Publication Data

US 2018/0339793 A1 Nov. 29, 2018

(51) Int. Cl.
*B64G 1/00* (2006.01)
*B64G 1/64* (2006.01)
*B64G 1/14* (2006.01)

(52) U.S. Cl.
CPC ........... *B64G 1/645* (2013.01); *B64G 1/005* (2013.01); *B64G 1/14* (2013.01)

(58) Field of Classification Search
CPC .. B64C 37/02; B64D 1/02; B64D 3/00; B64D 5/00; B64G 1/002; B64G 1/005; B64G 1/14; B64G 1/64; B64G 1/645; B64G 1/62; B64G 1/226
See application file for complete search history.

(56) References Cited

U.S. PATENT DOCUMENTS

| | | | | |
|---|---|---|---|---|
| 3,700,193 A * | 10/1972 | Bradley | ................. | B64G 1/007 244/159.3 |
| 3,702,688 A * | 11/1972 | Faget | ....................... | B64G 1/14 244/159.3 |
| 3,866,863 A * | 2/1975 | von Pragenau | .......... | B64G 1/14 244/159.3 |
| 3,929,306 A * | 12/1975 | Faget | ....................... | B64G 1/14 244/159.3 |
| 4,265,416 A * | 5/1981 | Jackson | ................... | B64G 1/14 244/159.3 |
| 4,650,139 A * | 3/1987 | Taylor | ...................... | B64C 1/38 244/1 N |
| 4,790,499 A * | 12/1988 | Taylor | ...................... | B64C 1/38 244/172.2 |
| 4,834,324 A * | 5/1989 | Criswell | ................ | B64G 1/002 244/158.9 |
| 4,884,770 A * | 12/1989 | Martin | ..................... | B64G 1/14 244/159.3 |
| 4,901,949 A * | 2/1990 | Elias | ........................ | B64D 5/00 244/49 |

(Continued)

*Primary Examiner* — Richard R. Green
*Assistant Examiner* — Michael A. Fabula
(74) *Attorney, Agent, or Firm* — Moore IP Law (57) ABSTRACT

An apparatus includes a body having at least one pitch control system and a mounting system, the mounting system configured to couple to a payload. The apparatus also includes a rocket engine coupled to the body and configured to accelerate the body to a hypersonic speed. The apparatus further includes a control system configured to release the payload while the body moves at the hypersonic speed by commanding the at least one pitch control system to adjust an angle of attack of the body to a negative angle of attack and commanding the mounting system to release the payload while the body is moving at the hypersonic speed and at the negative angle of attack.

20 Claims, 6 Drawing Sheets

(56) References Cited

U.S. PATENT DOCUMENTS

| | | | |
|---|---|---|---|
| 5,031,857 A | 7/1991 | MacConochie et al. | |
| 5,090,642 A * | 2/1992 | Salkeld | B64G 1/14 244/137.1 |
| 5,143,327 A * | 9/1992 | Martin | B64G 1/14 244/171.3 |
| 5,295,642 A * | 3/1994 | Palmer | B64D 39/00 244/171.4 |
| 5,402,965 A * | 4/1995 | Cervisi | B64G 1/005 244/159.3 |
| 5,740,985 A * | 4/1998 | Scott | B64D 5/00 244/137.4 |
| 6,068,211 A * | 5/2000 | Toliver | B64G 1/005 244/158.5 |
| 6,592,981 B1 * | 7/2003 | Rawal | B64G 1/58 244/159.1 |
| 6,926,226 B2 * | 8/2005 | Gathier | B64D 5/00 244/2 |
| 6,939,610 B1 * | 9/2005 | Kaul | B64G 1/226 428/403 |
| 8,528,853 B2 | 9/2013 | Luther | |
| 8,727,264 B1 * | 5/2014 | Rutan | B64D 3/00 244/158.1 |
| 9,944,410 B1 * | 4/2018 | Budd | B64C 31/02 |
| 10,384,797 B2 * | 8/2019 | Burgener | B64D 27/023 |
| 2003/0042367 A1 * | 3/2003 | Carpenter | B64G 1/14 244/159.3 |
| 2003/0052232 A1 * | 3/2003 | Hall | B64G 1/14 244/159.3 |
| 2003/0218101 A1 * | 11/2003 | Gathier | B64D 5/00 244/158.1 |
| 2005/0230517 A1 * | 10/2005 | Troy | B64C 1/005 244/2 |
| 2006/0032986 A1 * | 2/2006 | Maker | B64G 1/002 244/171.6 |
| 2008/0111030 A1 * | 5/2008 | Wainfan | B64G 1/002 244/159.3 |
| 2009/0140101 A1 * | 6/2009 | Salkeld | B64G 1/002 244/159.3 |
| 2009/0173830 A1 * | 7/2009 | Cormier | B64G 1/005 244/159.3 |
| 2011/0049288 A1 * | 3/2011 | Suzuki | B64C 37/02 244/2 |
| 2012/0025006 A1 * | 2/2012 | Luther | B64C 1/00 244/2 |
| 2013/0299626 A1 * | 11/2013 | Smith | B64D 5/00 244/2 |
| 2014/0158812 A1 * | 6/2014 | Luther | B64C 39/10 244/2 |
| 2015/0021428 A1 * | 1/2015 | Rutan | B64G 1/005 244/3 |
| 2016/0039521 A1 * | 2/2016 | London | B64D 5/00 244/2 |
| 2016/0102953 A1 * | 4/2016 | Kalifa | F42B 14/064 102/521 |
| 2016/0264263 A1 * | 9/2016 | Vuong | B64D 5/00 |
| 2017/0144761 A1 * | 5/2017 | Bluvband | B64C 3/46 |
| 2018/0127114 A1 * | 5/2018 | Salkeld | B64G 1/14 |
| 2018/0265211 A1 * | 9/2018 | Burgener | B64D 39/00 |
| 2019/0168887 A1 * | 6/2019 | Burgener | B64D 39/00 |

* cited by examiner

SYSTEM AND METHOD FOR HYPERSONIC PAYLOAD SEPARATION

FIELD OF THE DISCLOSURE

The present disclosure is generally related to separation of a payload at a hypersonic speed.

BACKGROUND

A reusable launch system includes one or more reusable components and is capable of launching a payload (e.g., into orbit). Some reusable launch systems include a reusable booster or first stage and a reusable spacecraft, like the Space Shuttle. In such reusable launch systems, the reusable booster launches the reusable spacecraft (e.g., the Space Shuttle Orbiter) or a reusable upper stage rocket into orbit. The reusable spacecraft (e.g., the Space Shuttle Orbiter) or the reusable upper stage rocket includes an internal payload bay and achieves orbital flight before deploying a payload from the internal payload bay. The separation between the reusable booster and the reusable spacecraft occurs at a positive angle of attack. Launching a reusable booster to orbit requires high forces and energy (roughly 30 times more energy) as compared to launching a reusable booster to sub-orbital altitudes. Additionally, operating a reusable spacecraft has increased costs as compared to systems that use a reusable booster to launch the payload (e.g., via an expendable upper stage rocket) into orbit from a sub-orbital altitude.

Other configurations use a reusable booster to launch an expendable upper stage rocket into orbit to deploy a payload. These configurations generally include multiple stage rockets with vertically stacked stages that take-off vertically and land vertically. Prior to separation of the upper stage, the booster engines are deactivated (e.g., main engine cut off (MECO)). Prior to and during separation of the upper stage rocket, the booster and the upper stages are oriented at a positive angle of attack. Reuse of the booster involves landing the booster vertically (e.g., in an upright or launch position) which is extremely complex and generally requires engine assistance, complex control systems, flip maneuvers, etc.

Alternatively, an assisted take-off reusable launch system deploys from an aircraft and uses a horizontally stacked configuration. The assisted take-off reusable launch system separates from the aircraft within the Earth's atmosphere at conditions where dynamic air pressures are relatively high (e.g., at relatively low altitudes where the Earth's atmosphere is relatively more dense). The low speeds and high dynamic pressures allows for a more controlled and reliable separation of the payload and the aircraft. For example, separation can occur with lower forces.

SUMMARY

In a particular implementation, an apparatus includes a body having at least one pitch control system and a mounting system, the mounting system configured to couple to a payload. The apparatus also includes a rocket engine coupled to the body and configured to accelerate the body to a hypersonic speed. The apparatus further includes a control system configured to release the payload while the body moves at the hypersonic speed by commanding the at least one pitch control system to adjust an angle of attack of the body to a negative angle of attack and commanding the mounting system to release the payload while the body is moving at the hypersonic speed and at the negative angle of attack.

In another particular implementation, a system includes a booster and an upper stage rocket. The booster includes a body having at least one pitch control system and a mounting system, the mounting system configured to couple to a payload. The booster also includes a rocket engine coupled to the body and configured to accelerate the body to a hypersonic speed. The booster further includes a control system configured to release the payload while the body moves at the hypersonic speed by commanding the at least one pitch control system to adjust an angle of attack of the body to a negative angle of attack and commanding the mounting system to release the payload while the body is moving at the hypersonic speed and at the negative angle of attack. The upper stage rocket includes a frame coupled to the mounting system of the booster, an upper stage propulsion system, and an upper stage controller configured to activate the upper stage propulsion system after release the upper stage rocket.

In another particular implementation, a method includes, during hypersonic flight of a booster, sending a first control command to a flight control system of the booster to adjust at least one pitch control system of the booster to orient a body of the booster at a negative angle of attack. The method further includes while the body is oriented at the negative angle of attack, sending a second control command to a mounting system of the booster to release a payload mounted to the body of the booster.

DETAILED DESCRIPTION

Implementations disclosed herein are directed to a reusable atmospheric re-entry launch system. The reusable atmospheric re-entry launch system (the "system") includes a reusable booster (e.g., a first stage) and a payload (e.g., an upper stage) coupled to an exterior of the booster. The booster (e.g., a spaceplane) is configured to separate from the payload at hypersonic speeds and to land or be recovered to be refurbished and re-used. The booster is configured to perform a vertical take-off and a horizontal landing, which greatly simplifies landing procedures and components and enables an unpowered landing. In some implementations, the payload is mounted to the top of the body of the booster such that the booster and payload are side by side during take-off and horizontally stacked during separation.

To launch the payload, the reusable booster powers the system to a hypersonic speed (e.g., greater than Mach 5) and to a relatively high altitude (e.g., the mesosphere or the thermosphere). The booster releases the payload at the hypersonic speed and at a low dynamic pressure. To release the payload without booster/payload contact after separation and to generate a threshold distance between the booster and payload, the booster (e.g., a body of the booster) is adjusted to a negative angle of attack relative to incoming airflow. For example, at least one pitch control system (e.g., one or more aerodynamic control surfaces, one or more orientation thrusters of a reaction control system, a thrust vectoring system of the rocket engine, or a combination thereof) of the booster is adjusted to orient the body of the booster at the negative angle of attack. While the booster is at the negative angle of attack, the booster releases the payload. At such conditions (e.g., when the body is at the negative angle of attack), the system may still have an upwards trajectory (e.g., gaining altitude) and the system may still have a positive pitch or attitude angle (e.g., an angle of the body relative to the ground or horizon). While at the negative angle of attack, the booster generates negative lift (e.g., more negative lift than the payload), which helps separate the booster and the payload. Additionally, the negative angle of attack and the hypersonic speed cause the aerodynamic forces to generate a positive air pressure (e.g., a higher air pressure relative to surrounding air pressure) between the booster and the payload which exerts a force that helps separate the booster and payload.

After the payload and booster are separated by the threshold distance, the payload may activate a payload propulsion system (e.g., an upper stage rocket) to achieve orbit. In a particular implementation, the threshold distance is a distance associated with ignition of the payload propulsion system. In an illustrative, non-limiting implementation, the threshold distance is 100 feet. Other threshold distances may be used, such as 50 feet, 500 feet, 1000 feet, etc. The threshold distance may be dependent on the propulsion system of the payload. For example, the threshold distance increases with increased temperatures of exhaust gasses of the payload propulsion system.

In some implementations, the booster includes actuators configured to exert a force on the payload during separation of the booster and the payload. The actuators enable separation at hypersonic speed with low dynamic pressure (e.g., zero pounds per square foot). Thus, by using actuators and a negative angle of attack, the payload can separate from the booster over a wide range of conditions (e.g., speed, altitude, density, and dynamic pressure) depending on mission requirements. For example, the payload can separate from the booster at dynamic pressure between zero pounds per square foot (psf) and 25 psf during which are be caused by variety of hypersonic speeds and altitudes/air densities.

Figure 1:
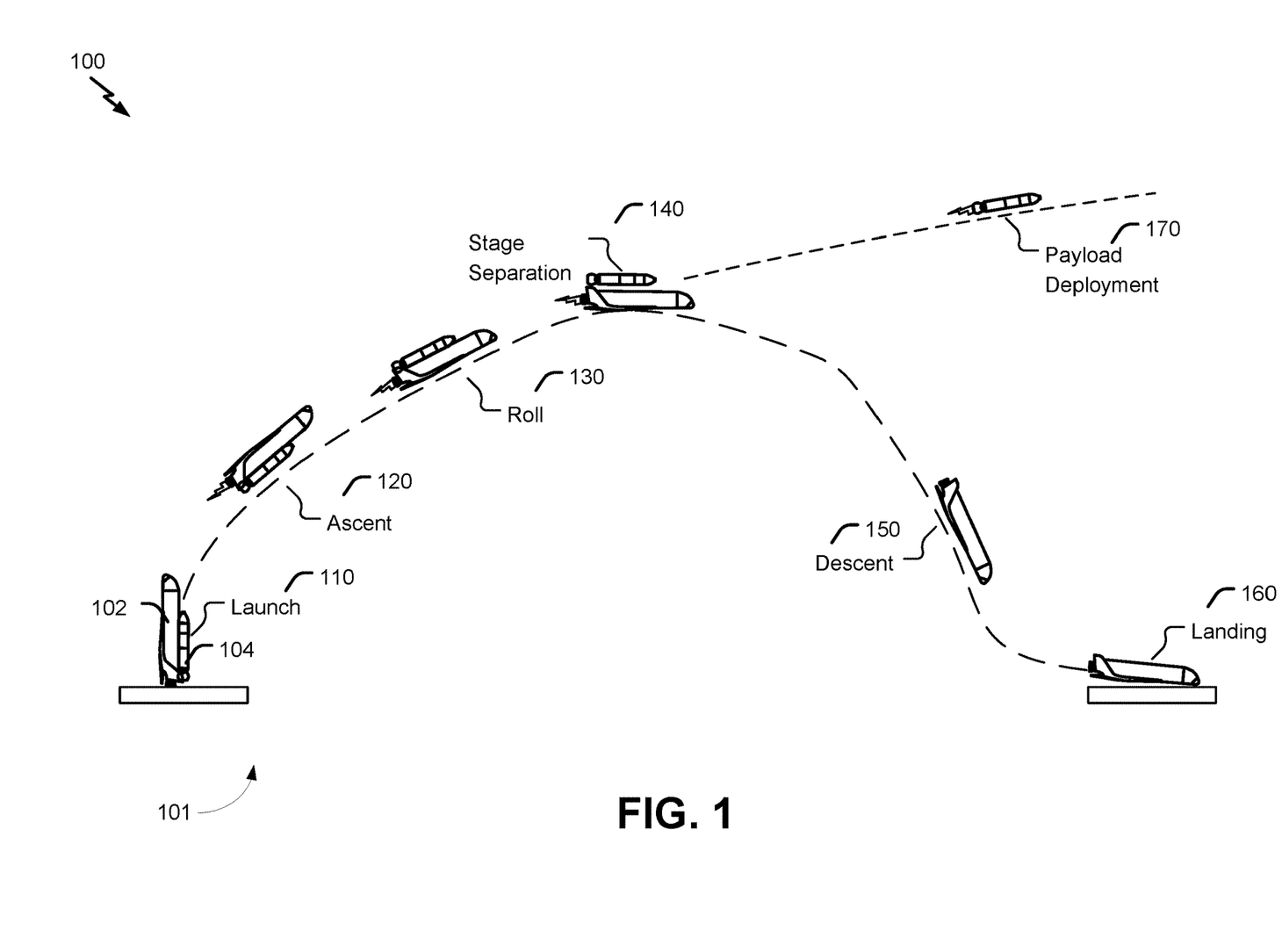
FIG. 1 is a diagram that illustrates an example of an exemplary mission profile of a reusable launch system.

FIG. 1 is a diagram 100 that illustrates an example of an exemplary mission profile of a reusable launch system 101. The reusable launch system 101 includes a booster 102 (e.g., a first stage of a multi-stage rocket) and an upper stage rocket 104. The booster 102 is reusable and may correspond to a spaceplane (e.g., an aerospace vehicle capable of operation within and outside of the Earth's atmosphere). The booster 102 is configured to take-off vertically and land horizontally. The upper stage rocket 104 includes a payload. The reusable launch system 101 is capable of launching the payload into orbit. The upper stage rocket 104 and the payload may be referred to as a payload of the booster 102.

As illustrated in FIG. 1, the exemplary mission profile includes a launch stage 110 where the booster 102 and the upper stage rocket 104 take-off in a vertical configuration. During an ascent stage 120, the booster 102 and the upper stage rocket 104 gain speed and altitude. During a portion of the ascent stage 120, the booster 102 and upper stage rocket 104 may be oriented such that the upper stage rocket 104 is facing the Earth. This configuration (e.g., an inverted configuration) causes incoming air flow to generate a force that biases the booster 102 and upper stage rocket 104 together.

The mission profile may also include a roll stage 130. In implementations where the booster 102 and the upper stage rocket 104 ascend in the inverted configuration, the booster 102 and the upper stage rocket 104 may roll 180 degrees to a non-inverted configuration before separation of the booster 102 and the upper stage rocket 104.

During a separation stage 140, the booster 102 and the upper stage rocket 104 separate at hypersonic speed and a negative angle of attack. To illustrate, the booster 102 is oriented at the negative angle of attack relative to a direction of incoming airflow, and the booster 102 releases the upper stage rocket 104 at the hypersonic speed and the negative angle of attack. After a threshold separation distance is achieved, the upper stage rocket 104 activates its propulsion system and gains altitude. The separation stage 140 may occur at relatively low dynamic pressure and outside of the Earth's atmosphere in sub-orbital space (e.g., in the mesosphere or the thermosphere)

After separation, the booster 102 enters a descent stage 150 where the booster 102 re-enters the Earth's atmosphere and decreases altitude. A thermal protection system (e.g., an aerothermal coating) provides heat resistance and thermal shielding from aerodynamic heating during the descent stage 150. A landing stage 160 (or recovery stage) follows the descent stage 150. For example, the booster 102 may return to Earth as a glider and make an unpowered landing on a runway (e.g., land in a horizontal configuration).

The mission profile may further include a payload deployment stage 170. After separation, the upper stage rocket 104 releases or launches a payload to deploy the payload into orbit. After deployment of the payload, the upper stage rocket 104 may enter a decaying orbit and disintegrate safely in the atmosphere or may be directed to splashdown in the ocean.

Figure 2:
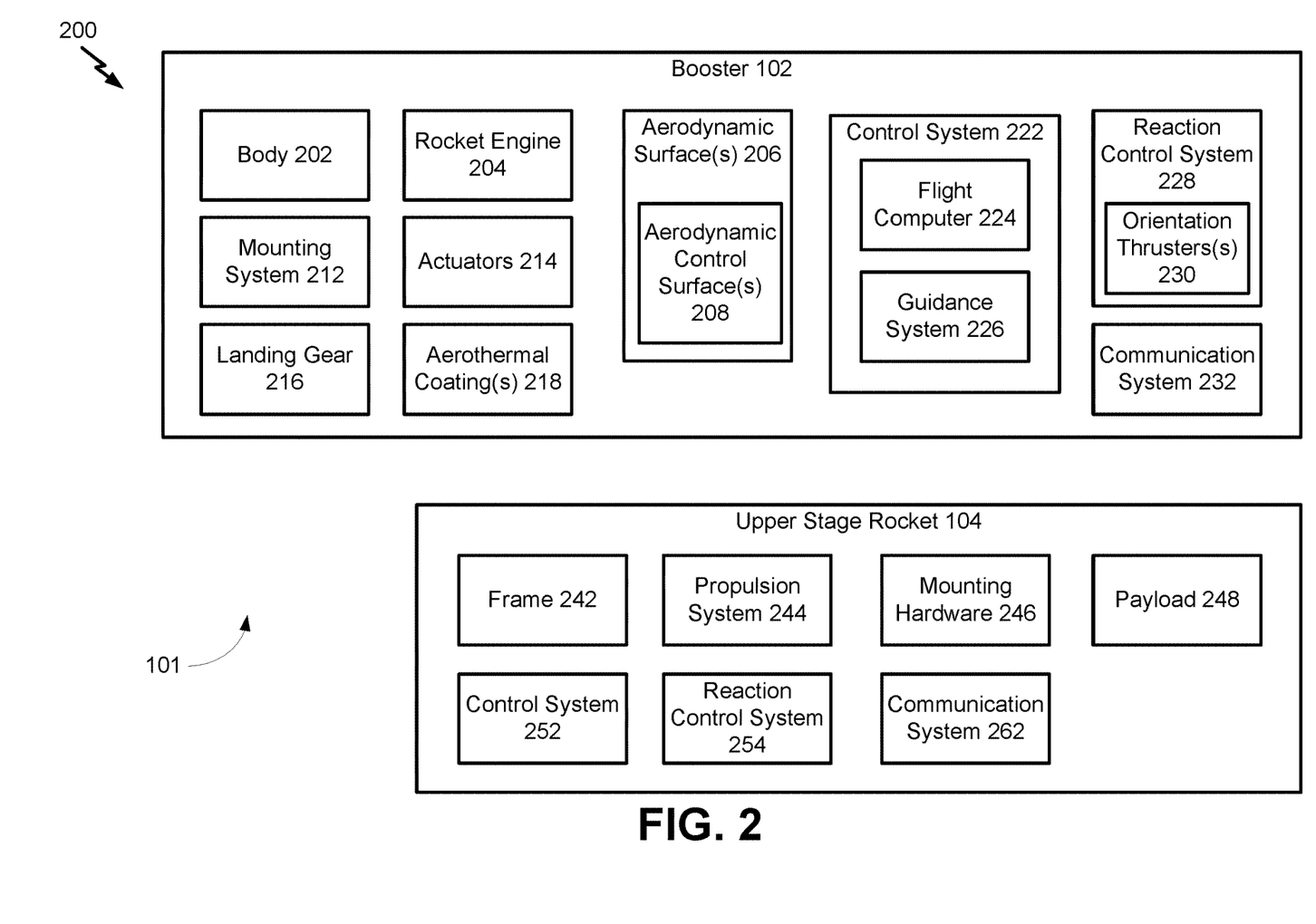
FIG. 2 is a diagram that illustrates an example of a block diagram of a booster and an upper stage rocket of the reusable launch system of FIG. 1.

FIG. 2 is a diagram 200 that illustrates an example of the booster 102 and the upper stage rocket 104 of the reusable launch system 101 of FIG. 1. The booster 102 includes a body 202, a rocket engine 204, at least one pitch control system, and a control system 222. The body 202 includes or corresponds to a frame or support structure of the booster 102. The body 202 is configured to take-off vertically and land horizontally. The body 202 includes a mounting system 212 configured to couple to the upper stage rocket 104 and to release the upper stage rocket 104 responsive to receiving a command (e.g., a release command). The mounting system 212 includes one or more coupling devices, such as latches, frangible fasteners (e.g., a frangible nut), or a combination thereof, configured to couple to and release the upper stage rocket 104.

The rocket engine 204 includes one or more rockets configured to generate thrust to accelerate the booster 102 to a hypersonic speed. The rocket engine 204 may include multiple types of rockets, such as solid rockets, liquid rockets, etc. In some implementations, the rocket engine 204 is configured to vector or direct the generated thrust. For example, the rocket engine 204 includes a thrust vane or is mounted on a gimbal to vector the generated thrust. In a particular implementation, the rocket engine 204 is configured to vector at least a portion of the thrust to further enhance separation between the booster 102 and the upper stage rocket 104. Additionally, in some implementations the rocket engine 204 is configured to generate thrust during separation to avoid contacting the upper stage rocket 104 after separation.

The at least one pitch control system is configured to adjust a pitch angle (e.g., an angle of attack) of the booster 102 and is configured to orient the booster 102 at a negative angle of attack at hypersonic speeds and relatively low (e.g., less than 25 psf) dynamic pressures. The at least one pitch control system includes or corresponds to one or more aerodynamic control surfaces 208 (e.g., a flight control surface), one or more orientation thrusters 230, a thrust vectoring system of the rocket engine 204, or a combination thereof.

The one or more aerodynamic control surfaces 208 include or correspond to a system of devices that are configured to adjust an attitude (e.g., roll, pitch, and yaw) of the booster 102. The one or more aerodynamic control surfaces 208 may include or correspond to one or more ailerons, elevators, rudders, wing tips (e.g., wing tip rudders) flaps, etc. The one or more aerodynamic control surfaces 208 correspond to portions of one or more aerodynamic surfaces 206 (e.g., a lift producing surface) of the body 202, such as a wing (e.g., a delta wing), a pair of wings, a blended body, a lifting body, a canard, a tail (e.g., vertical and horizontal stabilizers), wingtips (e.g., winglets), fins, etc. The one or more aerodynamic surfaces 206 are configured to generate (or cause the booster 102 to generate) more lift than the upper stage rocket 104.

The control system 222 is configured to release the upper stage rocket 104 while the body 202 moves at the hypersonic speed. The control system 222 is configured to command the at least one pitch control system to adjust an angle of attack of the body 202 to a negative angle of attack and command the mounting system 212 to release the upper stage rocket 104 while the body 202 is moving at the hypersonic speed and at the negative angle of attack. For example, the control system 222 receives flight control inputs from a user and generate commands based on the flight controls inputs. The commands adjust a position or a configuration of the one or more aerodynamic control surfaces 208, which generates a force that orients the body 202 at the negative angle of attack. Alternatively, the control system 222 is configured to adjust the one or more aerodynamic control surfaces 208 to orient the body 202 at the negative angle of attack independent of user input. In a particular implementation, the control system 222 performs take-off and landing of the body 202 independent of user input. In some implementations, the control system 222 includes or corresponds to a system of controllers (e.g., subsystem controllers). The system of controllers may include a flight computer 224, a guidance system 226, an engine computer, a reaction control system 228, a controller of the mounting system, a controller of the one or more actuators, etc.

Additionally or alternatively, the commands generated by the control system 222 cause the one or more orientation thrusters 230 of the reaction control system 228 to generate thrust to orient the body 202 of the booster 102 at the negative angle of attack, cause the rocket engine 204 (by thrust vectoring) to generate or direct thrust to orient the body 202 of the booster 102 at the negative angle of attack, or both.

In some implementations, the booster 102 further includes one or more actuators 214 configured to exert a force on the upper stage rocket 104 during release (separation). The force is configured to move the upper stage rocket 104 (e.g., payload) relative to the body. The one or more actuators 214 are disposed in or on the body 202. As an illustrative, non-limiting example, the one or more actuators 214 include or corresponds to hydraulic actuators. In other implementations, the one or more actuators include pneumatic actuators, chemical actuators (e.g., explosive piston), spring actuators, etc. In some implementations, the force (or total force) generated by the one or more actuators 214 is configured to move the upper stage rocket 104 from the booster 102 without causing a moment (e.g., rotation of the upper stage rocket 104 relative to the booster 102). In implementations where a single actuator is utilized, the single actuator is aligned with a center of gravity of the upper stage rocket 104 when the upper stage rocket 104 is coupled to the body 202 to limit rotation of the upper stage rocket 104. In implementations where multiple actuators are utilized, the multiple actuators may be arranged such that actuators of the multiple actuators are disposed on multiple sides of the center of gravity of the upper stage rocket 104 when the upper stage rocket 104 is coupled to the body 202 to limit rotation of the upper stage rocket 104.

The booster 102 includes landing gear 216 configured to enable the booster 102 to land on a runway in a horizontal landing configuration. The landing gear 216 is housed within the body 202 and is extended from the body 202 during descent. For example, the control system 222 generates a command to deploy the landing gear 216 from the body 202. The booster 102 includes an aerothermal coating 218 (e.g., a thermal protection system) configured to provide heat resistance and thermal shielding from aerodynamic heating (e.g., from hypersonic flight and atmospheric re-entry). For example, at least a portion of the body 202 includes the aerothermal coating 218 disposed on or coupled to the portion of the body 202. As an illustrative example, at least surfaces of a lower portion (e.g., a bottom or underbelly) of the body 202 include a spray on ceramic or foam coating. As another illustrative example, the booster 102 includes aerothermal tiles (e.g., thermally resistant ceramic, foam, or composite tiles) disposed on surfaces of a lower portion (e.g., a bottom or underbelly) of the body 202.

In some implementations, the booster 102 further includes one or more orientation thrusters 230 (e.g., rocket engines or thrusters) configured to generate thrust to rotate and stabilize the body 202 prior to release, during release, after release of the upper stage rocket, or a combination thereof. In some implementations, the one or more orientation thrusters 230 are included in a reaction control system 228 of the booster 102. The reaction control system 228 is configured to control activation of the one or more orientation thrusters 230. In a particular implementation, the one or more orientation thrusters 230 generate thrust to adjust an attitude of the booster 102, provide a translation force on the booster 102, or both. For example, the one or more orientation thrusters 230 generate thrust during the descent and landing stages to adjust the attitude of the booster 102. As another example, the one or more orientation thrusters 230 generate thrust to further separate the booster 102 from the upper stage rocket 104 after release.

The booster 102 further includes a communication system 232 configured to wirelessly transmit and receive signals. For example, the communication system 232 transmits information (e.g., sensor data, voice communications) to and receives commands from a remote operator.

The upper stage rocket 104 is configured to couple to the body 202 of the booster 102 via the mounting system 212. The upper stage rocket 104 includes a frame 242, a propulsion system 244, a payload 248, and a control system 252.

The frame 242 corresponds to a support structure of the upper stage rocket 104 and houses components of the upper stage rocket 104, including the payload 248. The frame 242 may include mounting hardware configured to couple to the mounting system 212 of the booster 102.

The propulsion system 244 includes one or more rockets configured to generate thrust. For example, the propulsion system 244 may include one or more liquid rockets, solid rockets, electro rockets, nuclear rockets, etc. In some implementations, the propulsion system 244 is further configured to vector the generated thrust to control an attitude of the upper stage rocket 104. The payload 248 includes or corresponds to cargo of the upper stage rocket 104 that is to be deployed (released or launched). The payload 248 may be released or launched into orbit, such as a low Earth orbit (LEO), a geo-synchronous orbit (GSO or GEO), a geostationary transfer orbit (GTO), etc.

The control system 252 may be similar to the control system 222 of the booster 102. For example, the control system 252 is configured to generate commands to control activation of the propulsion system 244, release of the payload 248, adjustments of the attitude of the upper stage rockets 104, etc. In some implementations, the control system 252 is configured to activate the propulsion system 244 in response to determining that a distance from the booster 102 to the upper stage rocket 104 is greater than or equal to a threshold separation distance. In a particular implementation, (e.g., when the propulsion system 244 includes a liquid rocket), the control system 252 is configured to adjust an amount of thrust generated by the propulsion system 244.

In some implementations, the upper stage rocket 104 further includes a 262 communication system configured to wirelessly transmit and receive signals. For example, the communication system 262 transmits information (e.g., sensor data, voice communication, etc.) to and receives commands from a remote operator.

Prior to operation, the booster 102 and the upper stage rocket 104 are coupled together. For example, the booster 102 and the upper stage rocket 104 may be coupled together on a launch pad or prior to delivery to the launch pad. The mounting hardware 246 (e.g., mounting attachments) of the upper stage rocket 104 is coupled to the mounting system 212 (e.g., latches) of the booster 102.

During operation (e.g., lift-off), the rocket engine 204 of the booster 102 is activated and generates thrust. The thrust provides a lifting force which starts the ascent of the reusable launch system 101 (e.g., the booster 102 and the upper stage rocket 104). As the reusable launch system 101 ascends, the reusable launch system 101 may be flown inverted to provide negative pressure between booster 102 and the upper stage rocket 104. Additionally, flying inverted may provide increased thermal resistance, better system loading, and provide a horizon as a reference when the booster 102 is manned). The rocket engine 204 accelerates the reusable launch system 101 to a hypersonic speed (e.g., greater than or equal to Mach 5) and to an altitude (e.g., the mesosphere or the thermosphere) where the dynamic pressure is relatively low (e.g., less than 25 psf).

Prior to release of the upper stage rocket 104, the reusable launch system 101 may roll (e.g., roll 180 degrees) such that the bottom or belly of the body 202 of the booster 102 is facing towards the Earth or ground. Prior to releasing the upper stage rocket 104, the body 202 of the booster 102 is oriented to a negative angle of attack relative to the incoming air flow, as described further with reference to FIG. 4. The control system 222 generates a command (e.g., a first command) to orient the body 202 of the booster 102 at the negative angle of attack. The command is sent to at least one pitch control system to orient the body 202 of the booster 102 at the negative angle of attack. In a particular implementation, the flight computer 224, responsive to receiving the command, adjusts the one or more aerodynamic control surfaces 208. To illustrate, the flight computer 224 may calculate an adjustment and generate a signal configured to cause ailerons of a wing (e.g., a delta wing), rudders of wingtips, or a combination thereof, to be adjusted. Adjusting the one or more aerodynamic control surfaces 208 generates a force to rotate the body 202 to the negative angle of attack. Additionally or alternatively, the one or more orientation thrusters 230 of the reaction control system 228 or the rocket engine 204 (by thrust vectoring) generate or direct thrust to orient the body 202 of the booster 102 at the negative angle of attack.

Because the reusable launch system 101 is ascending the body of the booster 102 may have a positive angle (e.g., pitch angle) relative to the horizon (e.g., nose up) while being at the negative angle of attack. For example, a vertical component of the incoming air flow is greater than the negative angle of attack. The positive angle relative to the horizon enables the reusable launch system 101 to continue gaining altitude during separation. Additionally, the one or more aerodynamically surfaces 206 (e.g., wings) may have a positive or negative angle of attack relative to the incoming air flow. For example, when an inclination of the wings is offset relative to the body of the booster, the wings may be at a positive angle of attack relative to the incoming air flow when the body 202 is at the negative angle of attack. The angle of attack of the body 202 may be determined by an attitude indicator (e.g., a gyroscope).

In some implementations, the rocket engine 204 of the booster 102 is configured to be inactive during release of the upper stage rocket 104. For example, prior to release of the upper stage rocket 104, the rocket engine 204 of the booster 102 is deactivated or ceases to generate thrust (e.g., runs out of fuel). In other implementations, the rocket engine 204 of the booster 102 is configured to be active (or activated) during release of the upper stage rocket 104.

At the hypersonic speed and the negative angle of attack, the control system 222 generates a command (e.g., a second command) to release the upper stage rocket 104 and sends the command to the mounting system 212. Responsive to the command, the mounting system 212 releases the upper stage rocket 104. The hypersonic speed and the negative angle of attack generate a positive air pressure between the body 202 of the booster 102 and the upper stage rocket 104 which helps to separate the booster 102 and the upper stage rocket 104. In some implementations, the control system 222 also generates one or more commands (e.g., a third command) to activate the one or more actuators 214. The one or more actuators 214 generate a force (e.g., a separation or translation force) that is configured to separate the booster 102 and the upper stage rocket 104. The one or more actuators 214 enable a faster separation and provide a greater portion of a total separation force at lower dynamic pressures. The one or more actuators 214 are arranged such that the force is applied to provide translation to the upper stage rocket 104 and not rotation of the upper stage rocket 104.

After release, the booster 102 and the upper stage rocket 104 are controlled such that the booster 102 and the upper stage rocket 104 avoid contact. The booster 102 is maintained at the negative angle of attack or is adjusted to a second negative angle of attack. The booster 102 is oriented at the second negative angle of attack by adjusting the at least one pitch control system. For example, the booster 102 is oriented at the second negative angle of attack by adjusting the one or more aerodynamic control surfaces 208, by activating the one or more orientation thrusters 230 of the reaction control system 228, by directing thrust (e.g., thrust vectoring) of the rocket engine 204, or a combination thereof. The second negative angle of attack may have a greater magnitude than the negative angle of attack. In a particular example, the negative angle of attack is within −2 to −5 degrees and the second negative angle of attack is greater than −5 degrees.

Additionally, the upper stage rocket 104 is controlled to avoid contact with the booster 102. For example, one or more orientation thrusters of the reaction control system 254 of the upper stage rocket 104 is activated to rotate and stabilize the upper stage rocket 104.

After release of the upper stage rocket 104, the booster 102 is configured to land. For example, if the booster 102 is inverted, the booster 102 performs a roll to a non-inverted configuration such that the booster 102 descends belly side down. Additionally, the landing gear 216 are deployed. During descent, the aerothermal coating provides thermal protection.

The booster 102 glides and lands on a runway in a horizontal (i.e., a conventional) configuration. In some implementations, the booster 102 lands autonomously. In other implementations, the booster 102 lands under pilot control, such as on-board control or remote control. Landing in the horizontal configuration enables the booster 102 to land without complicated vertical landing procedures (e.g., flips, powered landing, etc.). Additionally, landing on runway, as opposed to a parachute splash down in a body of water prevents corrosion and water damage which improves reusability by reducing turn-around time, reducing cost, and increasing recovery percentage.

After landing, the booster 102 is refurbished. For example, the booster 102 is inspected and the rocket engine 204 refueled. The booster 102 is coupled to a second upper stage rocket or a second payload for a second mission (e.g., a second take-off). The booster 102 may be reused multiple times. Reusing the booster 102 greatly reduces cost.

Meanwhile, the upper stage rocket 104 activates the propulsion system 244 after a threshold separation distance is achieved. For example, the control system 252 activates the propulsion system 244 after a separation distance of 100 feet is achieved, as an illustrative, non-limiting example. Alternatively, the propulsion system 244 is activated based on a duration or responsive to receiving a command via the communication system 262. The propulsion system 244 generates thrust to position the upper stage rocket 104 and the payload 248 at a designated altitude. Responsive to reaching the designated altitude or a designated position, the upper stage rocket 104 launches the payload 248 (e.g., into orbit). Alternatively, the control system 252 launches the payload 248 responsive to receiving a user input (e.g., from a pilot or via the communication system 262).

In some implementations, the upper stage rocket 104 activates the propulsion system 244 while the rocket engine 204 of the booster 102 is active (e.g., tandem staging). In other implementations, the reusable launch system 101 includes or more additional stage (e.g., upper stages) in a parallel or tandem staging configuration. In a particular implementation, the upper stage rocket 104 corresponds to a final stage of the one or more additional stages. In other implementations, the reusable launch system 101 ascends non-inverted, releases the upper stage rocket 104 inverted, or both.

Figure 3:
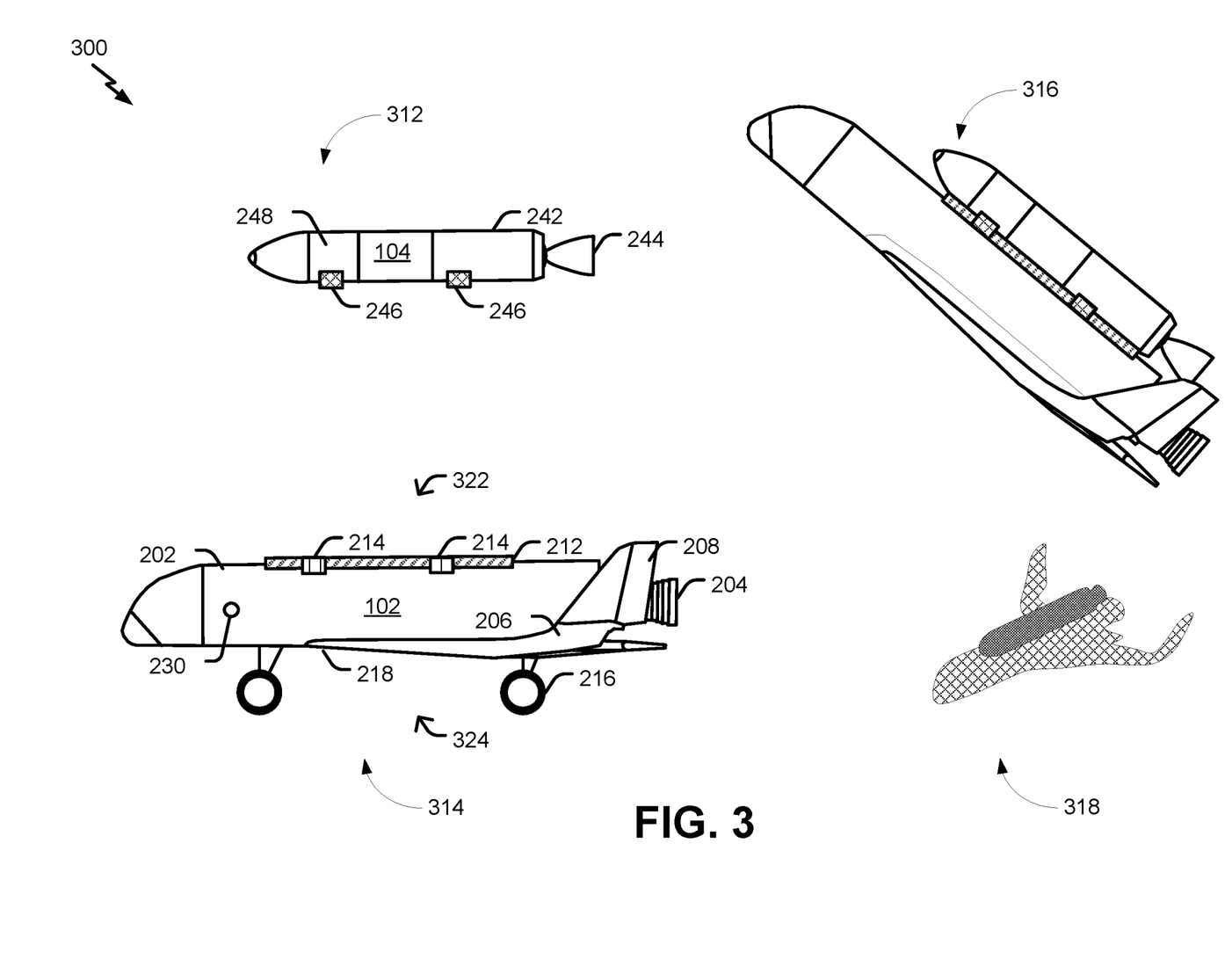
FIG. 3 is a diagram that illustrates multiple representations of an example of the booster and the upper stage rocket of FIG. 1.

FIG. 3 is a diagram 300 that illustrates multiple representations of an example of the booster 102 and the upper stage rocket 104. FIG. 3 includes a first representation 312 depicting the upper stage rocket 104 and a second representation 314 that depicts the booster 102. A third representation 316 and a fourth representation 318 depict the booster 102 and the upper stage rocket 104 coupled together from different views. The multiple representations of FIG. 3 illustrate components (e.g., external components) of the booster 102 and the upper stage rocket 104 described with reference to FIG. 2.

The first representation 312 illustrates the frame 242, the propulsion system 244, the mounting hardware 246, and the payload 248 of the upper stage rocket 104. The second representation 314 illustrates the body 202, the rocket engine 204, the one or more aerodynamic surface 206, and the one or more aerodynamic control surfaces 208. The second representation 314 also illustrates a top side 322 and a bottom side 324 (e.g., underbelly) of the body 202. The second representation 314 further illustrates landing gear 216 extended from and below the body 202 and the aerothermal coating 218 on the bottom side 324 (e.g., lower surfaces of the body 202). The second representation 314 illustrates the mounting system 212 on the top side 322 (e.g., upper surfaces) of the body 202, the one or more actuators 214, and the one or more orientation thrusters 230. The third representation 316 illustrates the mounting hardware 246 of the upper stage rocket 104 coupled to the mounting system 212 of the booster 102. The fourth representation 318 illustrates an isometric view (including shading) of the booster 102 and the upper stage rocket 104.

Figure 4:
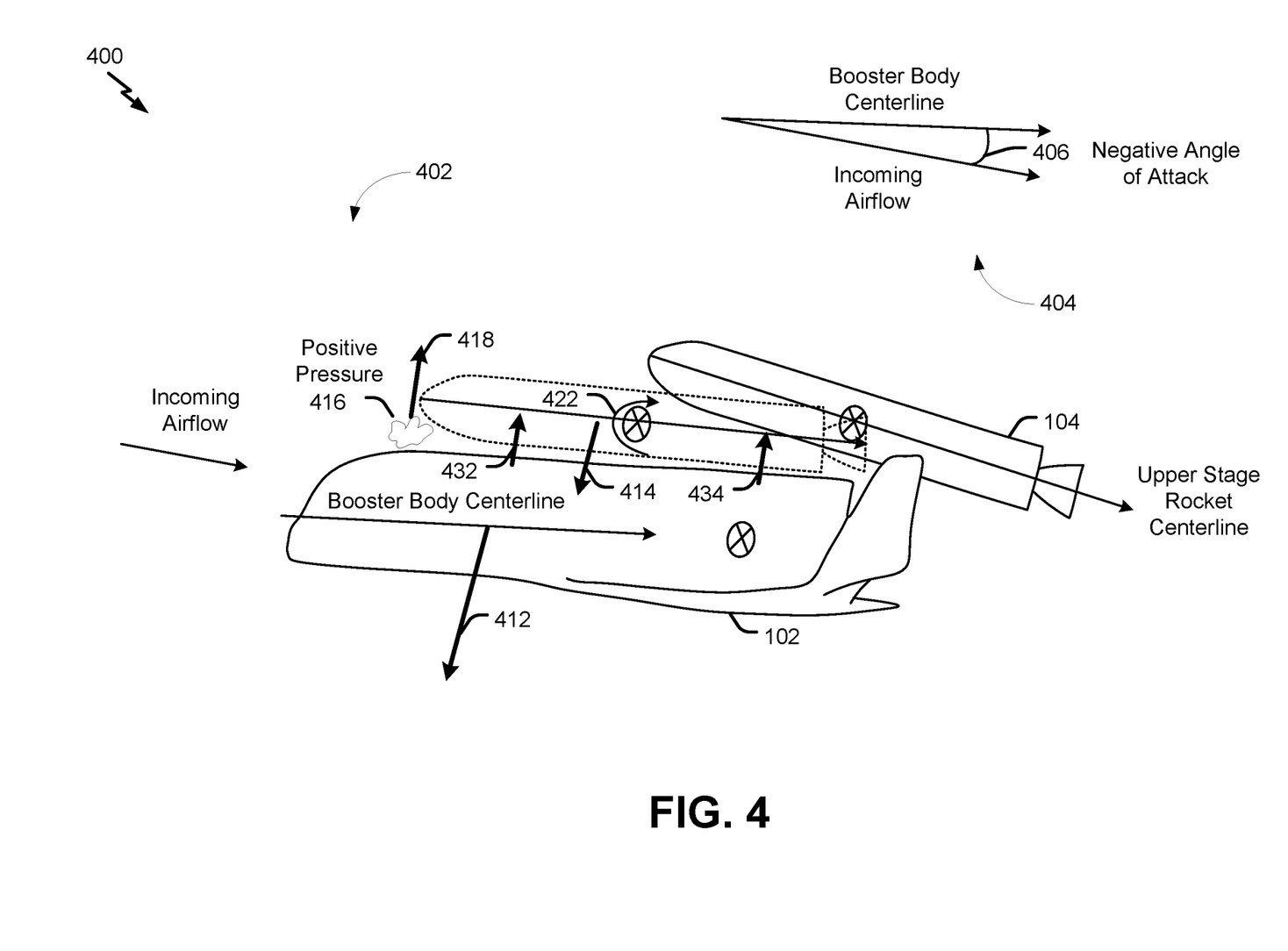
FIG. 4 is a diagram that illustrates another example of forces acting on the booster and the upper stage rocket during separation of FIG. 1.

FIG. 4 is a diagram 400 that illustrates an example of forces acting on the booster 102 and the upper stage rocket 104 during separation. FIG. 4 includes a force diagram 402 that illustrates the booster 102 at a negative angle of attack 406 and an angle of attack diagram 404 that illustrates the negative angle of attack 406. In the force diagram 402, each of the booster 102 and the upper stage rocket 104 have a corresponding center of gravity (indicated by a circle with an "X" inside) and center of pressure. Forces acting on the booster 102 and the upper stage rocket 104 may be simplified and modeled as if the forces are acting on the center of pressure and the booster 102 and the upper stage rocket 104 rotate about their respective center of gravity. Thrust forces, drag forces (e.g., a bow shock force), and gravitational forces are not illustrated for simplification.

While the booster 102 is oriented at the negative angle of attack 406, the booster 102 generates a first negative lift force 412 (downward or earthward as illustrated in FIG. 4) and the upper stage rocket 104 generates a second negative lift force 414 (downward or earthward as illustrated in FIG. 4). The first negative lift force 412 is generated by the body 202 and the one or more aerodynamic surfaces 206 of the booster 102 and is greater in magnitude than the second negative lift force 414 generated by the upper stage rocket 104. The negative lift forces 412 and 414 are orthogonal (e.g., perpendicular) to the incoming air flow. Additionally, while the booster 102 is oriented at the negative angle of attack 406, a positive air pressure 416 accumulates between the booster 102 and the upper stage rocket 104. The positive air pressure 416 generates a force 418 (e.g., a separation force) that pushes the booster 102 and the upper stage rocket 104 apart. The force 418 is illustrated as a positive force that pushes the upper stage rocket 104 upwards or away from Earth. Because the force 418 is forward of the center of gravity of the upper stage rocket 104, the force 418 causes a moment 422 and the upper stage rocket rotates (e.g., clockwise as illustrated in FIG. 4). A sum of the forces 412, 414, and 418 cause the booster 102 and the upper stage rocket 104 to separate without contact after release, because the larger first negative lift force 412 causes the booster 102 to gain altitude more slowly than the upper stage rocket 104.

In some implementations, actuators of the booster 102, such as the one or more actuators 214, provide additional forces, actuation forces 432 and 434. The actuation forces 432 and 434 are illustrated as a positive force that pushes the upper stage rocket 104 away from the booster 102. As illustrated in FIG. 4, the actuation forces 432 and 434 are positioned on opposite sides of the center of gravity of the upper stage rocket 104 to limit generation of a moment (e.g., rotation) of the upper stage rocket 104. The actuation forces 432 and 434 cause the booster 102 and the upper stage rocket 104 to separate and enable separation at low dynamic pressures. For example, as an altitude of the booster 102 increases, the atmosphere becomes less dense. As a result, the dynamic pressure decreases and the forces 412, 414, and 418 decrease in magnitude. A magnitude of the actuation forces 432 and 434 is independent of the dynamic pressure (e.g., independent of the speed and air pressure), and the actuation forces 432 and 434 provides a greater portion of a sum of the forces 412, 414, 418, 432, and 434 at lower dynamic pressures. By utilizing the actuation forces 432 and 434, the booster 102 may separate without contact from the upper stage rocket 104, may separate from the upper stage rocket 104 more quickly, or both, at relatively low dynamic pressures.

Figure 5:
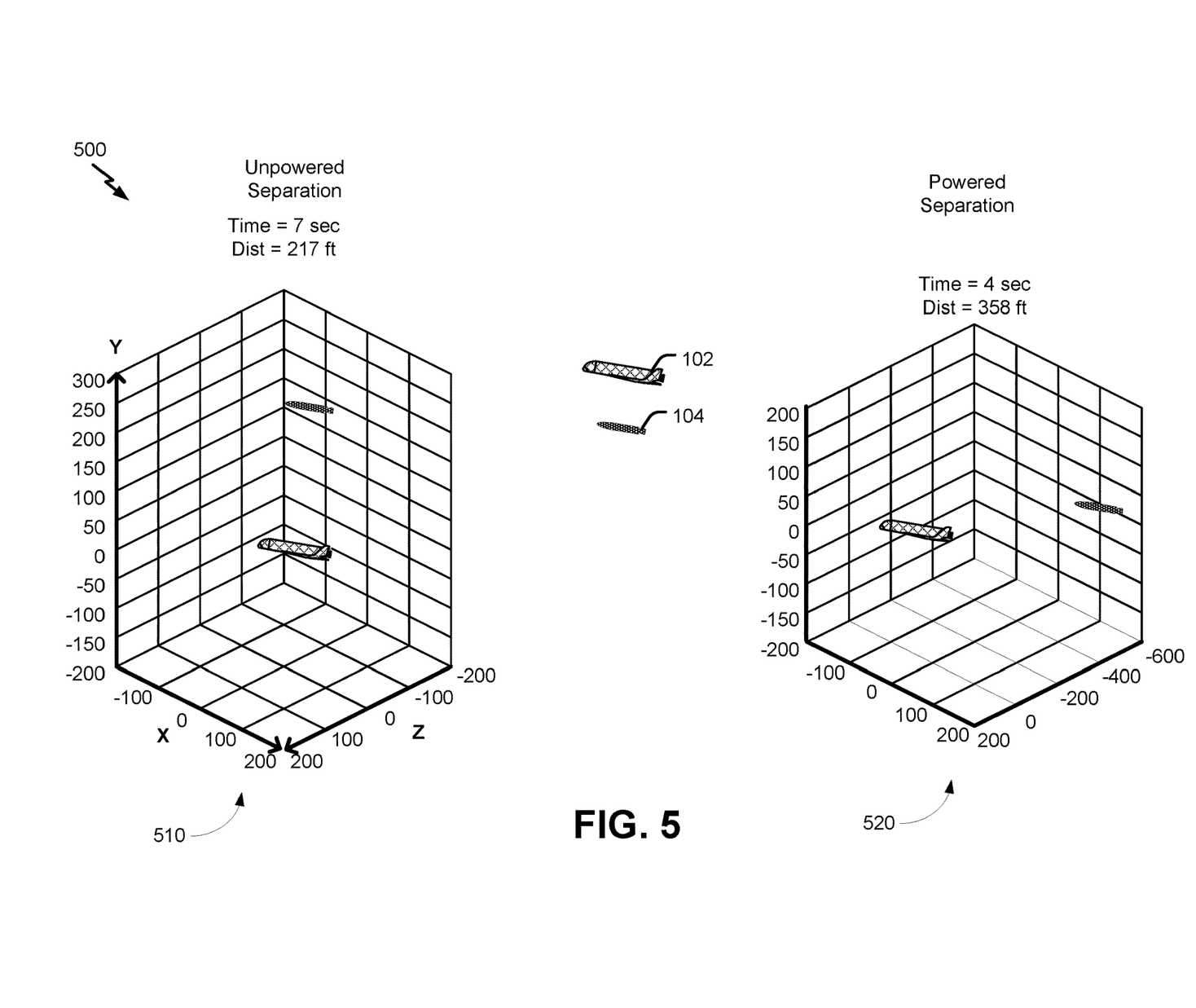
FIG. 5 is a diagram that illustrates an example of graphs of separation distances for powered and unpowered separation.

FIG. 5 is a diagram 500 that illustrates an example of graphs 510 and 520 of separation distances for powered and unpowered separation. Powered separation refer to the booster 102 releasing the upper stage rocket 104 with the rocket engine of the booster 102 on or active. Unpowered separation refers to the booster 102 releasing the upper stage rocket 104 with the rocket engine of the booster 102 off or inactive. The booster 102 and the upper stage rocket 104 are depicted by small icons or representations in the graphs 510 and 520.

A first graph 510 illustrates positions of the booster 102 and the upper stage rocket 104 after an unpowered release the upper stage rocket 104 (i.e., the rocket engine of the booster 102 is off or inactive). In the first graph 510, the booster 102 and the upper stage rocket 104 have a separation distance of 217 feet 7 seconds after release. The unpowered separation between the booster 102 and the upper stage rocket 104 is mostly in the vertical direction (y-axis) because the negative lift generated by the aerodynamic surfaces of the booster 102 causes the booster 102 to generate more negative lift (a force that pushes the booster towards Earth) than the upper stage rocket 104. Additionally, actuators of the booster 102 generate and exert additional force in the vertical direction (y-axis) on the upper stage rocket 104. As a result, the booster 102 gains altitude less quickly than the upper stage rocket 104 and the separation occurs mostly in the vertical direction (y-axis).

A second graph 520 illustrates positions of the booster 102 and the upper stage rocket 104 after a powered release the upper stage rocket 104 (i.e., the rocket engine of the booster 102 on or active). In the second graph 520, the booster 102 and the upper stage rocket 104 have a separation distance of 358 feet 4 seconds after release. The powered separation between the booster 102 and the upper stage rocket 104 is mostly in the horizontal direction (x and z axes) because the rocket engine of the booster 102 is generating thrust in the horizontal direction. The actuators and negative lift generated by the aerodynamic surfaces of the booster 102 enable the booster 102 to separate from the upper stage rocket 104 without contact and without exhaust gases from the rocket engine damaging the upper stage rocket 104. As a result, after separation the booster 102 travels faster and farther than the upper stage rocket 104 in the horizontal direction (e.g., downrange) and the separation occurs mostly in the horizontal direction (x and z axes).

By utilizing powered separation, the booster 102 and the upper stage rocket 104 separate faster and to an increased separation distance as compared to unpowered separation. To illustrate, in the examples above, with powered separation the booster 102 and the upper stage rocket 104 reach a separation distance of 100 feet between 2 and 3 second after release, and with unpowered separation the booster 102 and the upper stage rocket 104 reach a separation distance of 100 feet just over 4 seconds after release. Powered separation requires more fuel and thus, more cost. Additionally, powered separation generates more heat as the rocket engine of the booster 102 is emitting hot exhaust gases while active. A powered separation may cause the booster 102 to release the upper stage rocket 104 at increased speeds and increased dynamic pressures as compared to unpowered separation.

Figure 6:
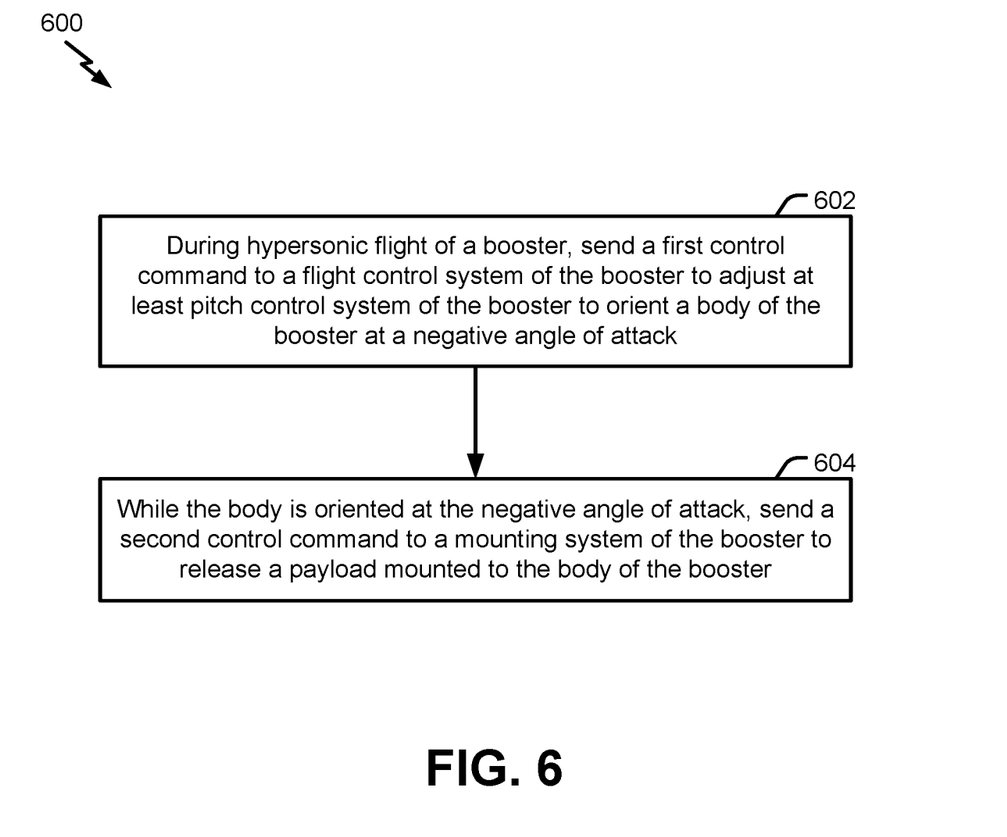
FIG. 6 is a flow chart of an example of a method for hypersonic payload separation.

FIG. 6 illustrates a method 600 of hypersonic payload (e.g., upper stage rocket, external payload, crew module, etc.) separation. The method 600 may be performed by the reusable launch system 101 of FIG. 1, the booster 102 of FIGS. 1-5, the control system 222 of FIG. 2, or a combination thereof. The method 600 includes, at 602, during hypersonic flight of a booster, sending a first control command to a flight control system of the booster to adjust at least one pitch control system of the booster to orient a body of the booster at a negative angle of attack. The booster may include or correspond to the booster 102, and the body of the booster may include or correspond to the body 202 of FIG. 2. The flight control system may include or correspond to the control system 222, the flight computer 224, or the guidance system 226, of FIG. 2, and the first control command may include or correspond to the first command of FIG. 2. The negative angle of attack is relative to an airflow associated with the body 202 and may include or correspond to the negative angle of attack 406. A pitch angle of the body 202 may be negative, zero, or positive during release.

The at least one pitch control system may include or correspond to the one or more one aerodynamic control surfaces 208, the one or more orientation thrusters 230 of the reaction control system 228, a thrust vectoring system of the rocket engine 204 of FIG. 2, or a combination thereof.

The method 600 of FIG. 6 further includes, at 604, while the body is oriented at the negative angle of attack, sending a second control command to a mounting system of the booster to release a payload mounted to the body of the booster. The second control command may include or correspond to the second command of FIG. 2. The mounting system may include or correspond to the mounting system 212 of FIG. 2. The payload may include or correspond to the upper stage rocket 104, the payload 248, or a combination thereof. In some implementations, the control commands are generated automatically (e.g., responsive to detected conditions satisfying programmed conditions). In other implementations, the control commands are generated responsive to user input (e.g., on-board inputs or remote inputs received via a communication system). In some implementations, the mounting system couples the payload to an upper surface or portion (e.g., the top side 322) of the body of the booster, as described with reference to FIG. 3.

In some implementations, the method 600 further includes detecting the negative angle of attack. For example, an attitude indicator (e.g., gyroscope) determines and outputs an angle of attack indicator to the control system 222.

In some implementations, the method 600 further includes, prior to issuing the second control command, deactivating a rocket engine of the booster. In other implementations, the second control command is issued while a rocket engine of the booster is active.

In some implementations, the body is moving between Mach 5 and Mach 10 during release of the payload. Additionally, a dynamic pressure associated with the body (e.g., a dynamic pressure of the incoming airflow to the body) is between zero psf and 25 psf during release of the payload.

In some implementations, at the negative angle of attack, the booster generates more negative lift than the payload. Additionally, the negative angle of attack causes a positive air pressure to develop between the body and the payload. The booster is configured to avoid contacting the payload after release. In a particular implementation, the booster is configured to be at least 100 feet from the upper stage rocket (and payload) within five seconds of release.

In some implementations, the method 600 further includes, generating a third control command to activate one or more actuators of the booster, where the one or more actuators are configured to exert a force on the upper stage rocket. The force on the payload moves the payload relative to the body. The one or more actuators may include or correspond to the one or more actuators 214.

In some implementations, the method 600 further includes, activating one or more orientations thrusters of a reaction control system to orient the booster at the negative angle of attack. The one or more orientations thrusters may include or correspond to the one or more orientations thrusters 230 of the reaction control system 228. Additionally or alternatively, the method 600 further includes activating one or more orientations thrusters of a reaction control system to orient the booster at a second negative angle of attack or to separate the booster from the upper stage rocket.

In some implementations, the method 600 further includes, after release of the upper stage rocket 104, adjusting the body of the booster to a second negative angle of attack, the second negative angle of attack having a greater magnitude than the first negative angle of attack. For example, the control system 222 generates a fourth control command to adjust the at least one pitch control system (e.g., one or more aerodynamic control surfaces 208) of the booster 102 to orient the body 202 of the booster 102 at the second negative angle of attack (e.g., −10 degrees). Additionally or alternatively, the control system 222 orients the booster 102 at the second negative angle of attack by thrust vectoring or activation of the one or more orientation thrusters 230.

In some implementations, the method 600 further includes, landing the booster 102 on a runway. For example, the booster 102 may perform a powered or unpowered landing (e.g., glide). To illustrate, the booster 102 may receive flight control inputs from a user and generate control commands based on the flight controls inputs. Alternatively, the booster may land (and take-off) independent of user input.

In some implementations, the method 600 further includes, after landing or recovery of the booster inspecting the booster. The method 600 further includes refurbishing (e.g., refueling) the rocket engine of the booster and the thermal protection system (e.g. replacing or repairing the aerothermal coating 218, such as ceramic tiles).

In a particular implementation, the control system 222 is configured to control the hypersonic payload separation as described above with reference to FIGS. 1-5. For example, the control system 222 may include one or more controllers configured to execute computer-executable instructions (e.g., a program of one or more instructions) stored in a memory. Each controller may include a processor and a memory. The instructions, when executed, cause the control system 222 to perform one or more operations of the method 600. For example, execution of the computer-executable instructions cause the control system 222 to, during hypersonic flight of a booster, sending a first control command to a flight control system of the booster to adjust an aerodynamic control surface of the booster to orient a body of the booster at a negative angle of attack. Execution of the computer-executable instructions further cause the control system 222 to, while the body is oriented at the negative angle of attack, sending a second control command to a mounting system of the booster to release a payload mounted to the body of the booster.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
 a body having at least one pitch control system and a mounting system, the mounting system configured to couple to a payload;
 a rocket engine coupled to the body and configured to accelerate the body to a hypersonic speed; and a control system configured to release the payload while the body moves at the hypersonic speed by commanding the at least one pitch control system to adjust an angle of attack of the body to a negative angle of attack and commanding the mounting system to release the payload while the body is moving at the hypersonic speed and at the negative angle of attack.

2. The apparatus of claim 1, wherein the at least one pitch control system comprises one or more one aerodynamic control surfaces, one or more orientation thrusters of a reaction control system, or a combination thereof.

3. The apparatus of claim 2, further comprising at least one wing coupled to the body, wherein the body is reusable, and wherein the payload comprises an upper stage rocket.

4. The apparatus of claim 1, further comprising one or more actuators coupled to the body, the one or more actuators configured to exert a force on the payload to move the payload relative to the body.

5. The apparatus of claim 4, wherein the one or more actuators are hydraulically activated.

6. The apparatus of claim 1, further comprising:
landing gear coupled to a first side of the body, wherein the body is configured to take-off vertically and land horizontally; and
an aerothermal coating associated with at least a portion of the first side, wherein the payload is mounted to a second side of the body opposite the first side.

7. The apparatus of claim 1, wherein the angle of attack is relative to an airflow associated with the body.

8. The apparatus of claim 1, wherein the negative angle of attack generates positive air pressure between the body and the payload, and wherein the body generates more negative lift than the payload.

9. The apparatus of claim 1, wherein the rocket engine is configured to be active during release of the payload.

10. The apparatus of claim 1, wherein the rocket engine is configured to be inactive during release of the payload.

11. The apparatus of claim 10, further comprising one or more orientation thrusters configured to rotate and stabilize the body prior to release of the payload, during release, after release, or a combination thereof.

12. A system comprising:
a booster and an upper stage rocket, the booster comprising:
a body having at least one pitch control system and a mounting system, the mounting system configured to couple to the upper stage rocket;
a rocket engine coupled to the body and configured to accelerate the body to a hypersonic speed; and
a control system configured to release the upper stage rocket while the body moves at the hypersonic speed by commanding the at least one pitch control system to adjust an angle of attack of the body to a negative angle of attack and commanding the mounting system to release the upper stage rocket while the body is moving at the hypersonic speed and at the negative angle of attack; and
the upper stage rocket comprising:
a frame coupled to the mounting system of the booster;
an upper stage propulsion system; and
an upper stage controller configured to activate the upper stage propulsion system after release of the upper stage rocket.

13. The system of claim 12, wherein the booster further comprises an aerothermal coating disposed on an underbelly of the body, and wherein the mounting system is coupled to a top side of the body opposite the underbelly.

14. The system of claim 12, wherein the booster is configured to be reusable, wherein the booster is configured to take-off vertically and land horizontally, wherein the upper stage controller is configured to activate the upper stage propulsion system in response to determining that a distance from the booster to the upper stage rocket is greater than or equal to a threshold separation distance, and wherein the upper stage rocket is configured to deploy a payload.

15. The system of claim 12, wherein the booster further comprises a plurality of actuators configured to exert a force on the upper stage rocket during release.

16. The system of claim 12, wherein at least one of the booster and the upper stage rocket include a reaction control system and one or more orientation thrusters.

17. A method comprising:
during hypersonic flight of a booster, sending a first control command to a flight control system of the booster to adjust at least one pitch control system of the booster to orient a body of the booster at a negative angle of attack; and
while the body is oriented at the negative angle of attack, sending a second control command to a mounting system of the booster to release a payload mounted to the body of the booster.

18. The method of claim 17, wherein the body is moving between about Mach 5 and about Mach 10 during release of the payload, and wherein a dynamic pressure associated with the body is between about zero pounds per square foot (psf) and about 25 psf during release of the payload.

19. The method of claim 17, wherein, at the negative angle of attack, the booster generates more negative lift than the payload, and wherein the negative angle of attack causes a positive air pressure to develop between the body and the payload.

20. The method of claim 17, wherein the mounting system couples the payload to an upper surface of the booster, wherein the booster is configured to avoid contacting the payload after release, and wherein the booster is configured to be at least about 100 feet from the payload within about five seconds of release.

* * * * *